United States Patent
Lau

(10) Patent No.: US 11,943,132 B2
(45) Date of Patent: Mar. 26, 2024

(54) CROSS-LAN COMMUNICATION AND GROUP MEMBER CONTACT SYNCHRONIZATION

(71) Applicant: InstantShare Technology Limited, Hong Kong (CN)

(72) Inventor: Hung Lun Alan Lau, Hong Kong (CN)

(73) Assignee: InstantShare Technology Limited, Hong Kong (CN)

( * ) Notice: Subject to any disclaimer, the term of this patent is extended or adjusted under 35 U.S.C. 154(b) by 259 days.

(21) Appl. No.: 17/454,488

(22) Filed: Nov. 11, 2021

(65) Prior Publication Data

US 2023/0143067 A1 May 11, 2023

(51) Int. Cl.
| | |
|---|---|
| *H04L 45/02* | (2022.01) |
| *G06F 16/27* | (2019.01) |
| *H04L 45/16* | (2022.01) |
| *H04L 61/50* | (2022.01) |
| H04L 69/326 | (2022.01) |

(52) U.S. Cl.
CPC ............ *H04L 45/04* (2013.01); *G06F 16/27* (2019.01); *H04L 45/16* (2013.01); *H04L 61/50* (2022.05); *H04L 69/326* (2013.01)

(58) Field of Classification Search
CPC ......... G06F 16/27; H04L 45/04; H04L 45/16; H04L 69/326; H04L 61/50; H04L 61/5007

See application file for complete search history.

(56) References Cited

U.S. PATENT DOCUMENTS

| 5,917,825 | A | 6/1999 | Cohen | |
|---|---|---|---|---|
| 6,631,137 | B1 | 10/2003 | Lorrain et al. | |
| 7,106,716 | B1 * | 9/2006 | Tietsch | H04L 61/2503 370/395.54 |
| 7,373,660 | B1 | 5/2008 | Guichard et al. | |
| 2007/0248085 | A1 * | 10/2007 | Volpano | H04L 63/0272 370/389 |

FOREIGN PATENT DOCUMENTS

WO WO-2014068411 A1 * 5/2014 ......... H04L 12/2818

OTHER PUBLICATIONS

International Search Report of application No. PCT/CN2022/112733 issued from the Internal Searching Authority dated Oct. 25, 2022.

* cited by examiner

*Primary Examiner* — Zhensheng Zhang
(74) *Attorney, Agent, or Firm* — S&F/WEHRW

(57) ABSTRACT

Multicast and unicast communication among computing devices across different local area networks (LANs) and without static IP addresses is supported by assigning an instant-share (InS) address to an individual computing device. The InS address is recognizable by a dedicated router located in the Internet and enables the dedicated router to communicate with the individual computing device. The individual computing device embeds an InS address of a destination computing device in a data message to form an extended data message, and sends the extended data message to the dedicated router. The dedicated router then forwards the extended data message to the destination computing device. A group member contact synchronization among different computing devices in a group without Internet connectivity is also supported. Local lists of group members from different computing devices are collected. The most-recent one is used to update the local list of group members of a computing device.

22 Claims, 7 Drawing Sheets

CROSS-LAN COMMUNICATION AND GROUP MEMBER CONTACT SYNCHRONIZATION

ABBREVIATIONS

| | |
|---|---|
| IETF | Internet Engineering Task Force |
| IP | Internet Protocol |
| InS | Instant-share |
| InSP | Instant-share protocol |
| LAN | Local area network |
| NFC | Near field communication |
| OS | Operating system |
| QR | Quick response |
| TCP | Transmission Control Protocol |
| TLP | Transport-layer protocol |
| UDP | User Datagram Protocol |
| WiFi | Wireless Fidelity |
| WLAN | Wireless LAN |

FIELD OF THE INVENTION

The present invention relates to methods for grouping computing devices in different LANs to form a group of members, providing direct multicast or unicast communication across different LANs among the members in the group without going through any centralized application server and without requiring a static IP address, and achieving group member contact synchronization for all the members without relying on a cloud server in the Internet.

BACKGROUND

Realizing IP multicasting is practically manageable if all computing devices involved in IP multicasting are attached to the same LAN. On the other hand, it is relatively much more difficult to realize IP multicasting if the computing devices involved in IP multicasting are scattered over a plurality of different LANs even if these different LANs are interconnected through the Internet. The main reason is that an individual computing device attached to a certain LAN is usually assigned with a dynamic IP address rather than a static IP address. While plural computing devices attached to the same LAN (denoted as a common LAN) are managed by the common LAN in dynamic IP address allocation and in IP packet routing, information on dynamic IP address allocation for one LAN is rarely passed to another LAN. Assigning static IP addresses to different computing devices is not a practical option due to scarcity in IP address space. There is a need in the art for a technique of providing multicast communication for computing devices distributed across different LANs without assigning static IP addresses to the computing devices. Note that unicasting is a special case of multicasting. The technique is applicable not only to multicast communication but also unicast communication.

To support multicast communication for plural computing devices, a communication group consisting of member computing devices is set up. Practically, the communication group is updated from time to time whenever a new member computing device joins the group or an existing device decides to quit the group. Group member contact synchronization among the member computing devices is required to be achieved regularly. Conventionally, a list of group members is stored in a cloud server in the Internet, allowing the group member contact synchronization to be achieved through communicating the cloud server. However, this approach is not workable if a certain computing device in the group is disconnected from the Internet. There is also a need in the art that the above-mentioned technique provides a mechanism of group member contact synchronization even if one or more of the computing devices in the group are disconnected from the Internet.

SUMMARY OF THE INVENTION

The present invention provides a method for communicating data among computing devices distributed over plural LANs interconnected by the Internet.

In the method, an InS address is assigned to an individual computing device. The InS address is recognizable by a dedicated router located in the Internet and enables the dedicated router to communicate with the individual computing device. When the individual computing device has a first data message to be sent to a first computing device, and if the individual computing device and the first computing device are attached to different LANs, the individual computing device embeds a first InS address into the first data message to form an extended first data message, wherein the first computing device is assigned with the first InS address. The individual computing device then forwards the extended first data message to the dedicated router. Afterwards, the dedicated router forwards the extended first data message to the first computing device according to the first InS address extracted from the extended first data message. Advantageously, it allows the first data message to be sent across different LANs without a need for the first computing device to acquire a static IP address in accomplishing cross-LAN unicast communication.

In certain embodiments, the InS address of the individual computing device includes a static IP address of a gateway of a first LAN such that the dedicated router is communicable with the gateway. The individual computing device is attached to the first LAN, and the gateway connects the first LAN and the Internet. The InS address further includes a plurality of access-specific data for enabling the gateway to communicate with the individual computing device.

In certain embodiments, the extended first data message is transmitted from the individual computing device to the first computing device based on a TLP such that the extended first data message is encoded to be a plurality of TLP datagrams. A payload of an individual TLP datagram includes the first InS address. The TLP may be selected from TCP and UDP.

Certain embodiments of the present invention realize a first approach of intra-LAN unicast communication as follows. When the individual computing device has a second data message to be sent to a second computing device and if the individual computing device and the second computing device are attached to a same LAN denoted as a first common LAN, the individual computing device forwards the second data message to the second computing device according to a dynamic IP address assigned by the first common LAN to the second computing device for accomplishing intra-LAN unicast communication.

Certain embodiments of the present invention realize a second approach of intra-LAN unicast communication as follows. When the individual computing device has a second data message to be sent to a second computing device and if the individual computing device and the second computing device are attached to a same LAN denoted as a first common LAN, the individual computing device forwards the second data message to the second computing device according to a non-IP protocol supported by the first common LAN for accomplishing intra-LAN unicast communication.

Certain embodiments of the present invention realize cross-LAN multicasting communication as follows. For a communication group consisting of members selected from the computing devices, when an individual member has a third data message to be multicast to remaining members in the group, the remaining members are divided into first and second sets of members such that the individual member and each member in the first set are attached to different LANs and such that the individual member and each member in the second set are attached to a same LAN denoted as a second common LAN. The individual member creates or obtains a multicast InS address for representing a first list of respective InS addresses of members in the first set, and then informs the dedicated router that the multicast InS address is associated with the first list of respective InS addresses. The individual member embeds the multicast InS address into the third data message to form an extended third data message, and forwards the extended third data message to the dedicated router. Thereafter, the dedicated router multicasts the extended third data message to all members in the first set according to the first list of respective InS addresses. As a result, it advantageously allows the third data message to be multicast across different LANs without a need for all members in the first set to acquire respective static IP addresses in accomplishing cross-LAN multicasting communication.

In certain embodiments, the extended third data message is transmitted from the individual member to all the members in the first set based on a TLP such that the extended third data message is encoded to be a plurality of TLP datagrams. A payload of an individual TLP datagram includes the multicast InS address. The TLP may be selected from TCP and UDP.

In multicasting the third data message to the remaining members in the group, one option is that the individual member forwards the third data message to respective members in the second set according to IP multicast as standardized by IETF for accomplishing intra-LAN multicast communication. It advantageously allows all members in the second set to receive the third data message directly through the second common LAN without routing through and additionally burdening the dedicated router.

In multicasting the third data message to the remaining members in the group, another option is that the individual member forwards the third data message to respective members in the second set through a non-IP protocol supported by the second common LAN for accomplishing intra-LAN multicast communication. It has the same advantage of allowing all members in the second set to receive the third data message directly through the second common LAN without routing through and additionally burdening the dedicated router.

In certain embodiments, a communication group consisting of members selected from the computing devices is established. In establishing the group, the group is updated from time to time in response to admission of new members and leave of existing members. The establishing of the group comprises: identifying a host among the members for managing admission of the new members into the group and removal of the existing members from the group; creating and keeping, by an individual member in the group, a local list of group members at the individual member, wherein the local list of group members records all the members in the group, and includes a timestamp of last update for indicating recency of the local list of group members; updating, by the host, a corresponding local list of group members of the host in response to occurrence of new-member admission or existing-member removal, wherein the host's corresponding local list of group members is an authentic list of group members for the communication group; and regularly updating, by a non-host member in the group, a corresponding local list of group members of the non-host member with the authentic list of group members.

The timestamp of last update may be a version number of the list of group members.

The host may be identified to be a particular computing device that initiates creation of the group.

When the host admits a certain new member to join the group, the host may acquire a copy of InS address of said certain new member, and may also send a copy of InS address of the host to said certain new member. The copy of InS address of said certain new member is further incorporated into the authentic list of group members in updating the authentic list of group members such that the authentic list of group members includes respective InS addresses of all the members in the group.

When the authentic list of group members is updated, the host may store the authentic list of group members at a cloud server in the Internet for allowing the non-host member to update the non-host member's corresponding list of group members via obtaining the authentic list of group members from the cloud server.

In certain embodiments, the establishing of the group further comprises responding to initiating or receiving, by the individual member, a request for synchronizing respective local lists of group members among the members. In response to the request, the individual member multicasts the local list of group members to all members listed in the local list of group members except the individual member. As a result, the individual member receives one or more local lists of group members from any member in the group other than the individual member. The individual member augments the local list of group members with the received one or more local lists of group members to form a plurality of collected local lists of group members. A most-recent local list of group members having a latest timestamp of last update in the plurality of collected local lists of group members is determined by the individual member. The individual member updates the local list of group members of the individual member with the most-recent local list of group members. Advantageously, the individual member is allowed to update the local list of group members without a need to access the Internet.

In certain embodiments, the establishing of the group further comprises multicasting, by a first member selected from the members, the request for synchronizing the respective lists of group members to all the members in the group except the first member. The first member is an initiator of requesting synchronization of the respective lists of group members.

Other aspects of the present disclosure are disclosed as illustrated by the embodiments hereinafter.

Figure 1:
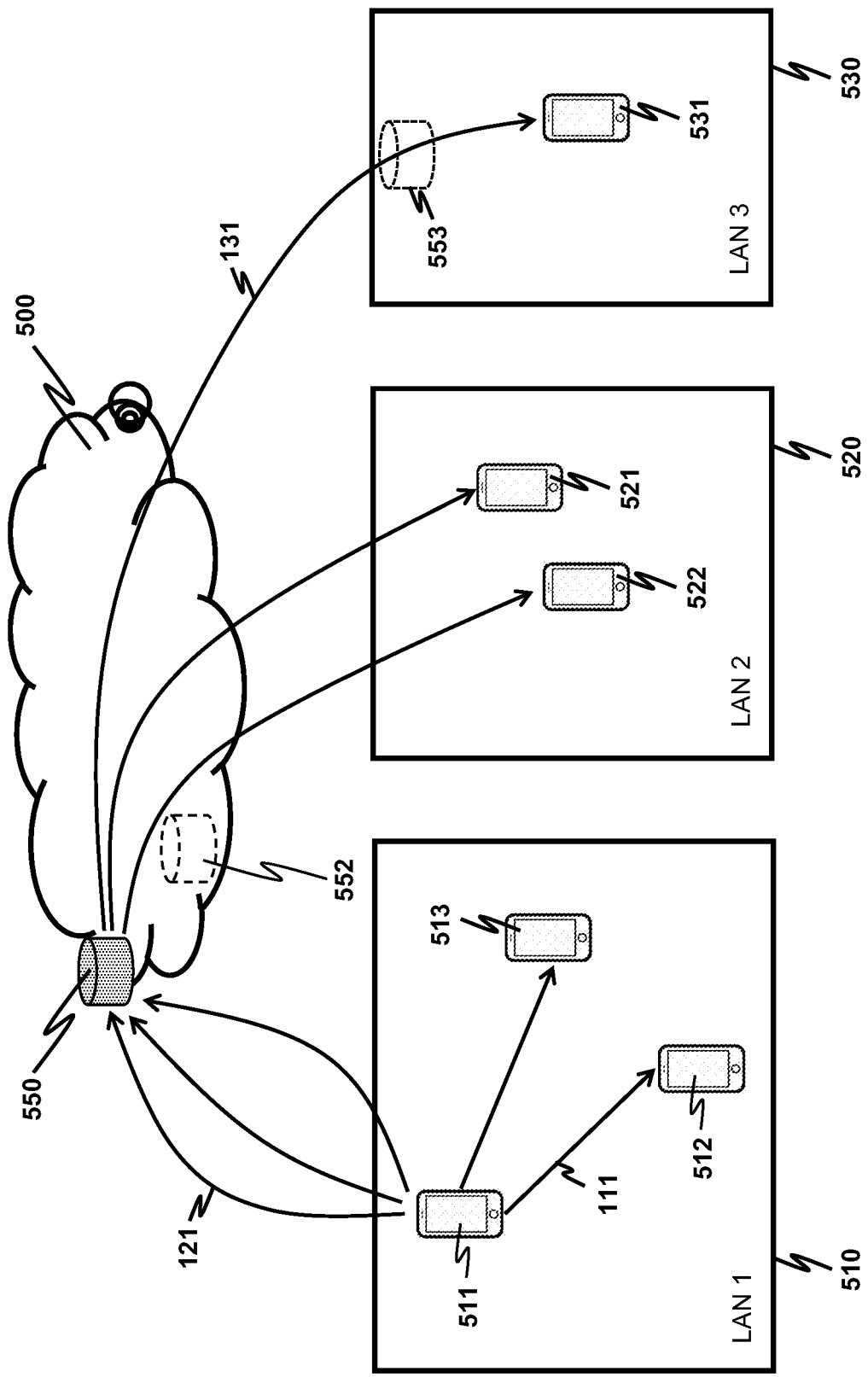
FIG. 1 depicts a typical situation of cross-LAN unicast communication and intra-LAN unicast communication for computing devices distributed over different LANs.

Skilled artisans will appreciate that elements in the figures are illustrated for simplicity and clarity and have not necessarily been depicted to scale.

DETAILED DESCRIPTION

The following definitions are used herein in the specification and the appended claims. "A cloud" or "a computing cloud" is interpreted in the sense of cloud computing or, synonymously, distributed computing over a network unless otherwise specified. "A server" is interpreted in the sense of computing. That is, a server is a computing server. A server is usually equipped with one or more computing processors for executing program instructions, and one or more storages for storing data. A server may be a standalone computing server (i.e. a physical server), a distributed server in the cloud, or a virtual server for handling clients' instructions. The one or more storages may be, for example, hard disks or solid-state disk drives.

As used herein in the specification and appended claims, "a computing device" is a device having computing power, communication capability and networking capability.

The computing power is realized by implementing the computing device with one or more computing processors. Usually, the computing device is further installed with one or more data storages, one or more input/output devices, etc., similar to implementing a computer. The one or more computing processors are appropriately programmed to enable the computing device to function as desired.

The communication capability is usually realized by installing one or more communication transceivers at the computing device, where each communication transceiver is configured to be compliant to a public communication standard, such as an Ethernet standard, Bluetooth, NFC, WiFi, 5G or any other terrestrial mobile communication standard. A communication transceiver may support wireline communication over copper cables, fiber-optic communication, or wireless communication.

The networking capability is usually realized by implementing one or more networking protocols at the one or more computing processors, where an individual networking protocol configures the one or more computing processors to network the computing device with other computing devices such that all the networked computing devices are mutually communicable under the individual networking protocol. A networking protocol may be an IP-based protocol such as the TCP/IP protocol, whereby two computing devices implemented with the TCP/IP protocol may be connected through the Internet. The networking protocol may be a non-IP protocol, such as the iOS AirDrop protocol. Hence, computing devices implemented with the same OS containing the non-IP protocol can be networked to form a private network but another computing device using a different OS is not joinable to the private network. One advantage of using the non-IP protocol is that more efficient operation may be achieved over using an IP-based protocol, resulting in improved performance.

A computing device may be a desktop computer, a workstation, a notebook computer, a tablet computer, a smartphone, a smartwatch, etc.

As used herein, "a LAN" is a communication network for connecting plural computing devices where the network is interfaced with the Internet by a gateway such that the gateway acts as an Internet service provider for providing Internet services to the computing devices that are attached to the network. As a first example, the LAN is a wired network or WLAN managed by a commercial Internet service provider. As a second example, the LAN is a 5G network for connecting smartphones where the 5G network has one or more gateways for providing Internet services to the smartphones. As a third example, the LAN is a WiFi hotspot connected to smart devices one of which is a smartphone connectable to a public 5G network, and the gateway connecting the Internet and the hotspot is located in the public 5G network. As a fourth example, the LAN is a multihop ad hoc network having a gateway connected to the Internet.

As used herein, "cross-LAN unicast communication" means unicast communication between a first computing device and a second computing device where the first and second computing devices are attached to different LANs. It is used herein that "cross-LAN multicast communication" means multicast communication from a first computing device to plural second computing devices where each second computing device is attached to a certain LAN different from the LAN that the first computing device is attached to.

As used herein, "intra-LAN unicast communication" means unicast communication between a first computing device and a second computing device where the first and second computing devices are attached to the same LAN. Similarly, it is used herein that "intra-LAN multicast communication" means multicast communication from a first computing to plural second computing devices where all the second computing devices and the first computing device are attached to the same LAN. Occasionally, the aforementioned LAN is denoted herein as a common LAN for convenience.

Disclosed herein is a method for communicating data among computing devices, where the computing devices are distributed over plural LANs interconnected by the Internet. Advantageously, the disclosed method enables the data to be transmitted across different LANs without a need for the computing devices to acquire static IP addresses in accomplishing cross-LAN unicast communication. Additionally, the method supports multicasting of data to a group of computing devices at different LANs with efficiency in multicast data transmission. Furthermore, the disclosed method provides a mechanism for group member contact synchronization.

Figure 3:
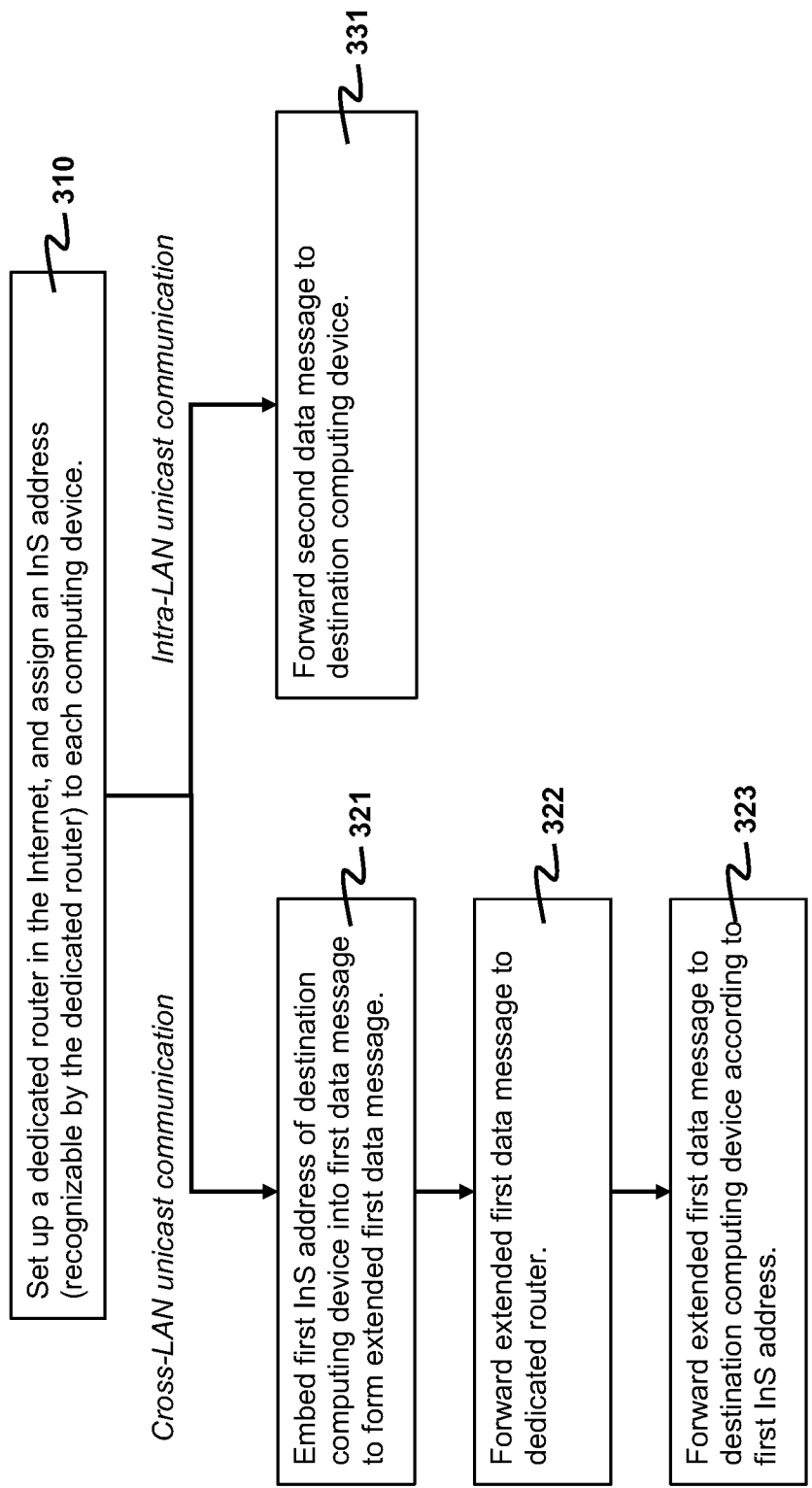
FIG. 3 depicts exemplary steps for accomplishing cross-LAN unicast communication and intra-LAN unicast communication.

The disclosed method is illustrated with the aid of FIGS. 1 and 3. FIG. 1 depicts a typical situation of cross-LAN unicast communication and intra-LAN unicast communication for illustrating the disclosed method, where computing devices 511-513, 521-522, 531 are distributed over three LANs 510, 520, 530 and data from a computing device in a LAN are transmitted to remaining computing devices over the three LANs 510, 520, 530. (As an example for illustrating the meaning of "remaining computing devices", if the computing device 511 in the LAN 510 is transmitted data to "remaining computing devices over the three LANs 510, 520, 530," these remaining computing devices are the computing devices 512-513, 521-522, 531.) FIG. 3 depicts exemplary steps of the disclosed method, where the two cases of cross-LAN unicast communication and intra-LAN unicast communication are considered.

Refer to FIG. 1. The computing devices 511-513 are attached to a first LAN 510. The computing devices 521, 522 are attached to a second LAN 520. The computing device 531 is attached to a third LAN 530. The three LANs 510, 520, 530 are different domains that are separately managed. Each LAN assigns dynamic IP addresses to computing devices attached to this LAN. However, static IP addresses, which are centrally managed on a global scale by international authorities and are therefore not easy to obtain, are not available for allocation to the computing devices 511-513, 521-522, 531.

Refer to FIG. 3. In step 310 of the disclosed method, a dedicated router 550 accessible by the computing devices 511-513, 521-522, 531 is set up in the Internet 500 for routing a data message sent from one computing device to another computing device in cross-LAN unicast communication. Each of the computing devices 511-513, 521-522, 531 may be provided with an IP address of the dedicated router 550 such that the dedicated router 550 is accessible to the computing devices 511-513, 521-522, 531. Furthermore, an InS address is assigned to an individual computing device among the computing devices 511-513, 521-522, 531 in the step 310. Advantageously, the InS address is recognizable by the dedicated router 550 and enables the dedicated router 550 to communicate with the individual computing device.

It is noticed that the individual computing device attached to a certain LAN is accessible from the Internet 500 if an entry point of this LAN is known and additional accessibility information for accessing the individual computing device from the entry point is also known. In certain embodiments, the InS address of the individual computing device includes two items. The first item is a static IP address of a gateway of a first LAN, where the individual computing device is attached to the first LAN, and the gateway connects the first LAN and the Internet 500. Thus, the gateway forms an entry point of the first LAN from the Internet 500. By using the first item, the dedicated router 550 is communicable with the gateway. The second item is a plurality of access-specific data for enabling the gateway to communicate with the individual computing device. One example of access-specific data is a UDP port number used as an identifier of the individual computing device in communicating with the gateway.

If a smartphone or a tablet computer is used as a computing device, the computing device may download an application from AppStore or Google Play. The application is executable in the computing device such that the IP address of the dedicated router 550 and the assigned InS address of the computing device are available to the computing device.

Without loss of generality, consider the computing device 511 for illustrating cross-LAN unicast communication and intra-LAN unicast communication as enabled by the disclosed method.

Exemplarily, the method includes steps 321-323 for accomplishing cross-LAN unicast communication. Consider a representative case that the computing device 511 attached to the first LAN 510 has a first data message to be sent to the computing device 531 attached to the third LAN 530. Denote the computing device 511 as a source computing device 511, and the computing device 531 as a destination computing device 531. In the step 321, the source computing device 511 embeds a first InS address into the first data message to form an extended first data message. The first InS address is the InS address assigned to the destination computing device 531. After the extended first data message is formed, the source computing device 511 forwards the extended first data message to the dedicated router 550 (denoted by a path 121) in the step 322. Thereafter, the dedicated router 550 forwards the extended first data message to the destination computing device 531 (denoted as a path 131) according to the first InS address extracted from the extended first data message in the step 323. Advantageously, it allows the first data message to be sent across different LANs (from the first LAN 510 to the third LAN 530) without a need for the destination computing device 531 to acquire a static IP address in accomplishing cross-LAN unicast communication. Similarly, all the computing devices 511-513, 521-522, 531 are not required to acquire respective static IP addresses to accomplish cross-LAN unicast communication. Another advantage of using the dedicated router 550 as an intermediate in delivering the extended first data message from the source computing device 511 to the destination computing device 531 is that the extended first data message is not required to be decoded and then handled by a centralized application server during the delivery. It enhances privacy and security of transmitted data in that no third-party server stores the data and owns the data, and there is no data leakage as no data is saved at the third party server.

Note that the third LAN 530 has a gateway 553 serving as an entry point of the third LAN 530 from the Internet 500. The first InS address may include a static IP address of the gateway 553.

The disclosed method further includes step 331 for accomplishing intra-LAN unicast communication. Consider a case that the source computing device 511 has a second data message to be sent to the computing device 512. For convenience, denote the computing device 512 as a destination computing device 512. Note that both the source computing device 511 and the destination computing device 512 are attached to the first LAN 510, which is denoted as a common LAN 510 for simplicity. In the step 331, the source computing device 511 forwards the second data message to the destination computing device 512 (via a path 111) based on a data transmission mechanism employed by the common LAN 510.

In one embodiment of the step 331, the second data message is forwarded to the destination computing device 512 according to a dynamic IP address assigned by the common LAN 510 to the destination computing device 512. In another embodiment of the step 331, the second data message is forwarded to the destination computing device 512 according to a non-IP protocol supported by the common LAN 510. As mentioned above, using the non-IP protocol may achieve a higher operational efficiency in transmitting the second data message over using the IP-based protocol to thereby improve the data-transmission performance.

Figure 2:
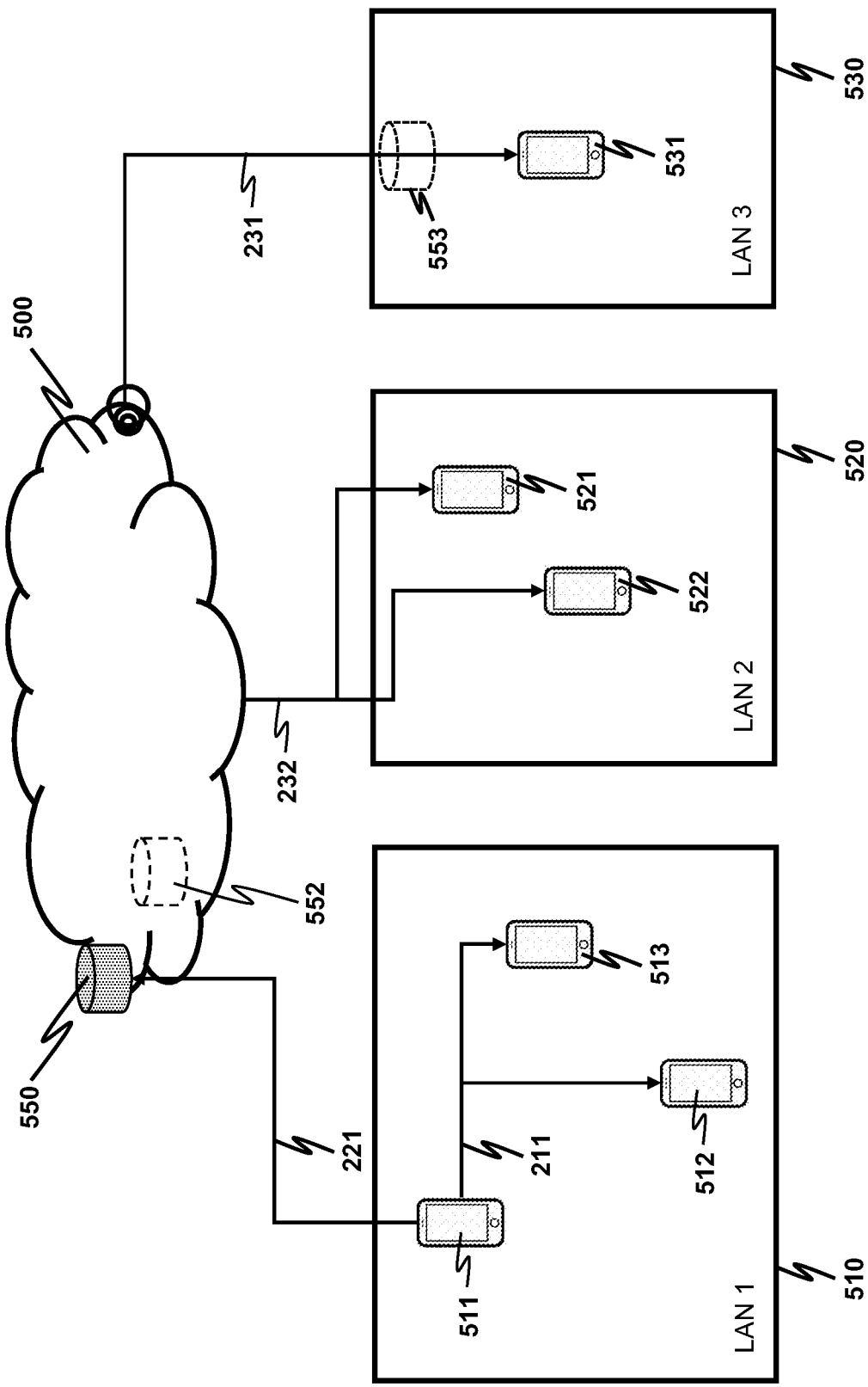
FIG. 2 depicts a typical situation of multicast communication within the same LAN and across different LANs.
Figure 4:
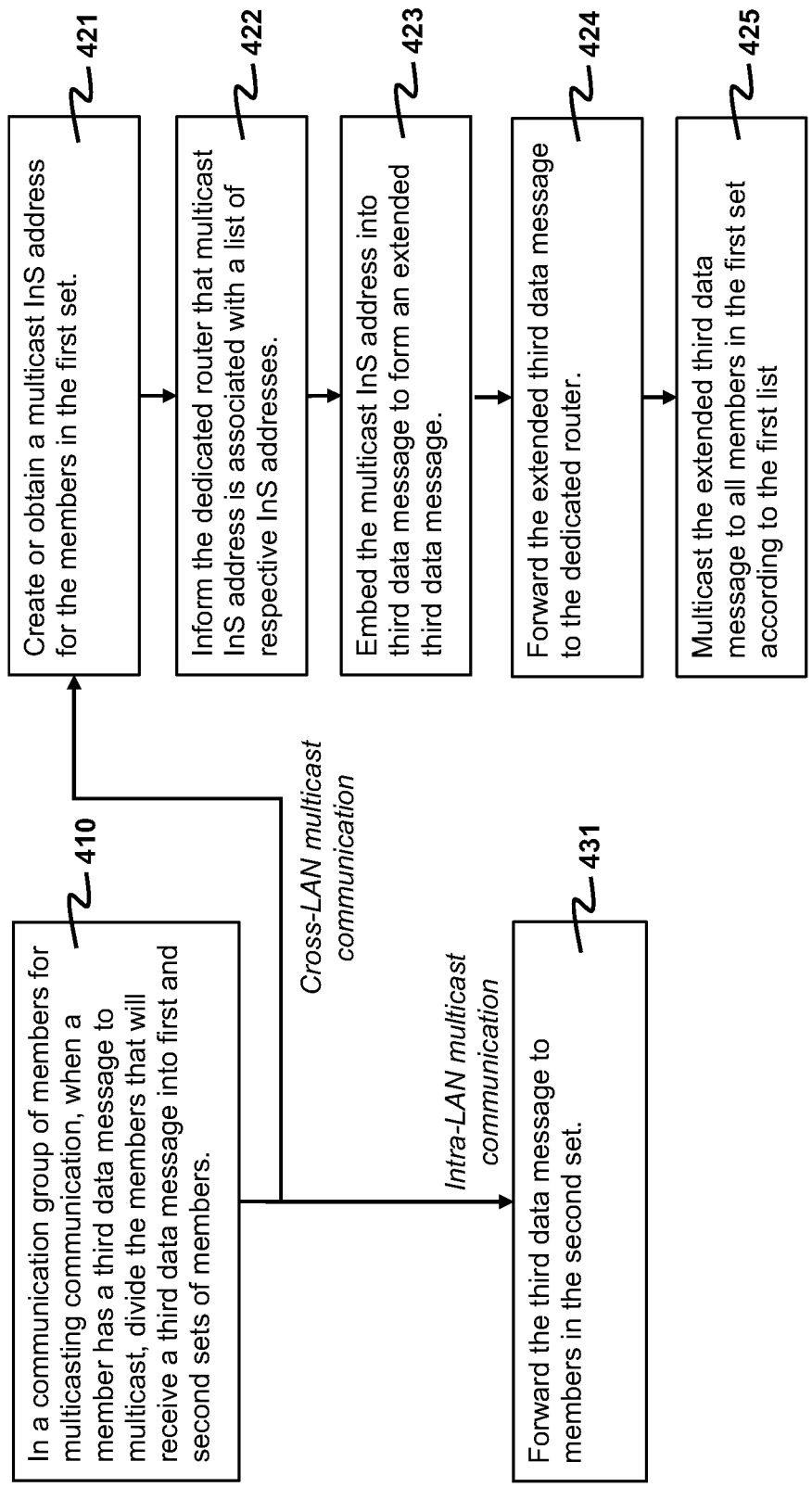
FIG. 4 depicts exemplary steps for accomplishing multicast communication within the same LAN and across different LANs.

Certain embodiments of the disclosed method provide multicast communication across different LANs. FIG. 2 depicts a typical situation of multicast communication within the same LAN and across different LANs. For illustration of the disclosed method, consider a representative case that the computing device 511 multicasts a third data message to the computing devices 512-513, 521-522, 531. For convenience, denote the computing device 511 as a source computing device, and each of the computing devices 512-513, 521-522, 531 as a destination computing device. FIG. 4 depicts exemplary steps of the disclosed method for providing cross-LAN multicast communication and intra-LAN multicast communication.

A communication group of members selected from the computing devices 511-513, 521-522, 531 is first established, where the members are eligible to receive data messages of any member of the group in multicast communication. In the representative case considered here, the members are the computing devices 511-513, 521-522, 531. For convenience, denote the computing devices 511-513, 521-522, 531 as members 511-513, 521-522, 531, respectively. Further consider that the member 511 has a third data message to be multicast to remaining members in the group, i.e. the members 512-513, 521-522, 531. Denote the member 511 as a source member 511, and the members 512-513, 521-522, 531 as destination members 512-513, 521-522, 531, respectively.

In step 410, the destination members 512-513, 521-522, 531 are divided into a first set of members and a second set of members such that the source member 511 and each member in the first set are attached to different LANs and such that the source member 511 and each member in the second set are attached to a same LAN, namely, the first LAN 510 or the common LAN 510. Hence, the first set of members consists of the destination members 521-522, 531, and the second set of members consists of the destination members 512, 513.

Steps 421-425 are used for accomplishing cross-LAN multicast communication.

In the step 421, the source member 511 creates or obtains a multicast InS address for representing a first list of respective InS addresses of members in the first set. It follows that the multicast InS address is associated with the first list of respective InS addresses. The multicast InS address is recognizable by the dedicated router 550 and informs the dedicated router 550 to perform multicast communication. The multicast InS address may be obtained by the source member 511 from the dedicated router 550, where the dedicated router 550 generates the multicast InS address. Alternatively, the multicast InS address may be created by the source member 511 based on, e.g., an application downloaded from the operator of the dedicated router 550 and executable in the source member 511.

In the step 422, the source member 511 informs the dedicated router 550 that the multicast InS address is associated with the first list of respective InS addresses. It follows that when the dedicated router 550 receives the third data message with the multicast InS address, the dedicated router 550 is aware that the third data message is multicast to different destination members according to the first list of respective InS addresses.

In the step 423, the source member 511 embeds the multicast InS address into the third data message to form an extended third data message.

After the extended third data message is formed in the step 423, the source member 511 forwards the extended third data message to the dedicated router 550 (via a path 221) in the step 424.

After the dedicated router 550 receives the extended third data message from the source member 511, the dedicated router 550 multicasts the extended third data message to all members in the first set according to the first list of respective InS addresses (via paths 231, 232) in the step 425. Generally, when the dedicated router 550 receives the extended third data message, the multicast InS address is first extracted from the extended third data message. The first list of respective InS address is then identified. Existing mechanisms in the Internet 500 for multicasting over the Internet 500 are used to forward the extended third data message to the destination members 521-522, 531 in the first set.

By the arrangement set forth in the steps 421-425, it advantageously allows the third data message to be multicast across different LANs without a need for all destination members 521-522, 531 in the first set to acquire respective static IP addresses in accomplishing cross-LAN multicast communication. Similar to the advantage enjoyed in cross-LAN unicast communication as mentioned above, using the dedicated router 550 instead of a centralized application server as an intermediate in cross-LAN multicast communication enhances privacy and security of transmitted data.

Step 431 is used for accomplishing intra-LAN multicast communication.

In the step 431, the source member 511 forwards the third data message to each member in the second set, i.e. destination members 512, 513, based on a data transmission mechanism employed by the common LAN 510. Advantageously, it allows all members in the second set to receive the third data message directly through the common LAN 510 without routing through and additionally burdening the dedicated router 550.

In one embodiment of the step 431, the third data message is forwarded to all members in the second set according to IP multicast as standardized by IETF. In another embodiment of the step 431, a non-IP protocol supported by the common LAN 510 is used in forwarding the third data message to all members in the second set. The non-IP protocol may be, for instance, a multicasting protocol of WiFi hotspot.

Figure 5:
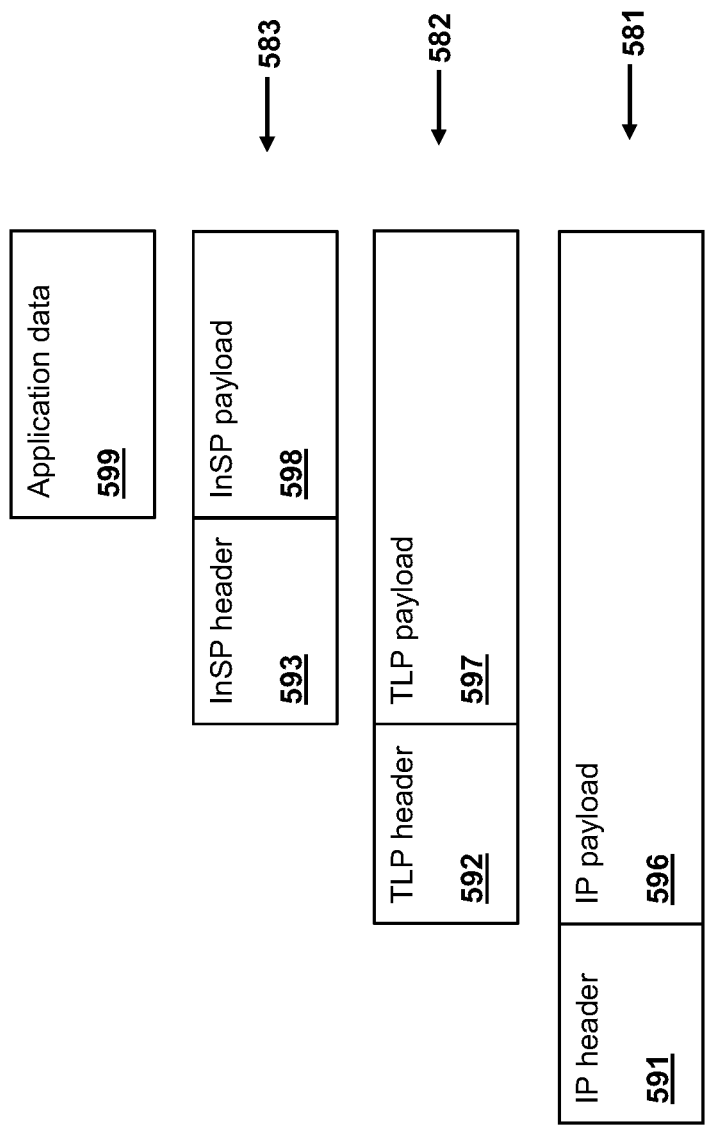
FIG. 5 depicts a layer structure of an IP datagram usable for embedding an InS address into a data message in cross-LAN multicast/unicast communication.

In the steps 321, 423, it is necessary to embed an InS address to a data message. FIG. 5 depicts a layer structure of an IP datagram 581 usable for embedding an InS address into a data message in cross-LAN multicast/unicast communication. The IP datagram 581 is composed of an IP header 591 and an IP payload 596. On top of the IP layer is the transport layer. TLPs that are used in the transport layer include TCP, UDP, and any other TLP as standardized by IETF. The IP payload 596 is a TLP datagram 582. The TLP datagram 582 is composed of a TLP header 592 and a TLP payload 597. If TCP is used as a TLP in transmitting the IP payload 596, the TLP datagram 582 is a TCP datagram so that the TLP header 592 and the TLP payload 597 are a TCP header and a TCP payload, respectively. Similarly, if UDP is used as the TLP, the TLP datagram 582 is a UDP datagram so that the TLP header 592 and the TLP payload 597 are a UDP header and a UDP payload, respectively. In the disclosed method, advantageously, on top of the transport layer is an InSP layer, which is introduced to carry the InS address. In the InSP layer, an InSP datagram 583 is contained in the TLP payload 597. The InSP datagram 583 is composed of an InSP header 593 and an InSP payload 598. The InSP header 593 contains the InS address. On top of the InSP layer is an application layer. The InSP payload 598 is used to store application data 599. The application data 599 are data taken from the data message.

In certain embodiments of cross-LAN unicast communication exemplified by the steps 321-323, the extended first data message is transmitted from the source computing device 511 to the destination computing device 531 based on a TLP such that the extended first data message is encoded to be a plurality of TLP datagrams, where a payload of an individual TLP datagram includes the first InS address, which is assigned to the destination computing device 531. The TLP is usually selected from TCP and UDP.

In certain embodiments of cross-LAN multicast communication exemplified by the steps 421-425, the extended third data message is transmitted from the source member 511 to all the members in the first set based on a TLP such that the extended third data message is encoded to be a plurality of TLP datagrams, where a payload of an individual TLP datagram includes the multicast InS address. Similarly, the TLP is usually selected from TCP and UDP.

Figure 6:
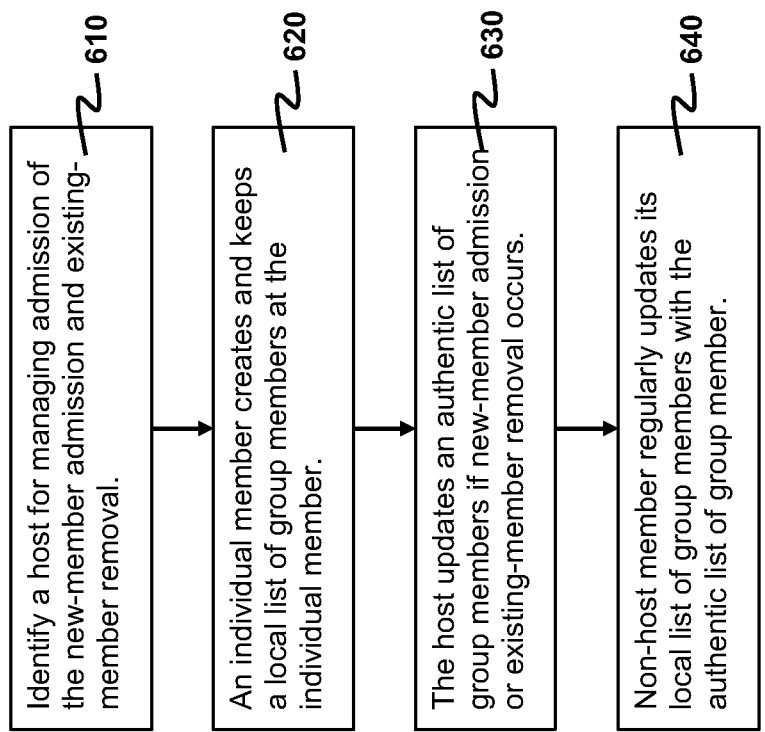
FIG. 6 depicts a flowchart showing exemplary steps in establishing the communication group for multicast communication.

As mentioned above, the communication group of members selected from the computing devices 511-513, 521-522, 531 is first established for facilitating multicast communication across different LANs. In establishing the communication group, the group is updated from time to time in response to admission of new members and leave of existing members. Although the communication group is primarily used for facilitating multicast communication, information about membership of the group may also be used for other purposes as deemed appropriate by those skilled in the art, such as for initiating unicast communication with a certain member in the group. FIG. 6 depicts a flowchart showing exemplary steps in a process of establishing the communication group.

In step 610, a host for managing admission of the new members into the group and removal of the existing members from the group is identified among the members. The host may be selected or appointed among the members as a manager for managing new-member admission and existing-member removal. Usually, the host is a particular computing device that initiates creation of the group. That is, this particular computing device is the earliest member of the group.

Without loss of generality, consider an illustrative example that: the computing device 511 is the host; the computing devices 511-513 and 521 are existing members of the group; the existing member 521 is about to leave the group; and the computing device 522 is about to join the group as a new member.

In step 620, an individual member in the group creates and keeps a local list of group members at the individual member. The local list of group members records all the members in the group, and includes a timestamp of last update for indicating recency of the local list of group members. In the illustrative example, each of the existing members 511-513 and 521 maintains a corresponding local list of group members.

In certain embodiments, the timestamp of last update is a version number of the list of group members.

In step 630, the host 511 updates the corresponding local list of group members of the host in response to occurrence of new-member admission or existing-member removal. It follows that the host's corresponding local list of group members is an authentic list of group members for the communication group. Usually, an existing member is removed from the group on request from a human user of this existing member, and a new member contacts the host 511 to request approval of joining the group.

In the illustrative example, the existing member 521 informs the host 511 that the existing member 521 decides to leave the group. The host 511 updates the authentic list of group members by removing a name or an identifier of the existing member 521 therefrom, preferably with deleting any accessibility information of the existing member 521 from the authentic list of group members.

In the illustrative example, the new member 522 sends a request to the host 511 for approving the new member 522 to join the group. Since the host 511 and the new member 522 are attached to different LANs, the request may be sent to the host 511 through the Internet 500. If the host 511 and the new member 522 are in close proximity, it is possible that the request is sent from the new member 522 to the host 511 via some short-range communication means, such as WiFi or sending of a QR code. Upon joining the group, the new member 522 creates a corresponding local list of group members and stores this list in the new member 522 according to the step 620.

In the step 630, when the host 511 admits the new member 522 to join the group, preferably the host 511 acquires a copy of InS address of the new member 522, and sends a copy of InS address of the host 511 to the new member 522. The copy of InS address of the new member 522 is further incorporated into the authentic list of group members in the step 630 such that the authentic list of group members includes respective InS addresses of all the members in the group.

In step 640, a non-host member in the group regularly updates a corresponding local list of group members of the non-host member with the authentic list of group members. The non-host member is a member of the group except the host 511.

Preferably and practically, when the authentic list of group members is updated or created, the host 511 stores the authentic list of group members at a cloud server 552 in the Internet 500 (in the step 630) for allowing the non-host member to update the non-host member's corresponding list of group members (in the step 640) via obtaining the authentic list of group members from the cloud server 552. As an advantage, the host 511 is free from a burden of being frequently contacted to provide the authentic list of group members to the non-host members.

Figure 7:
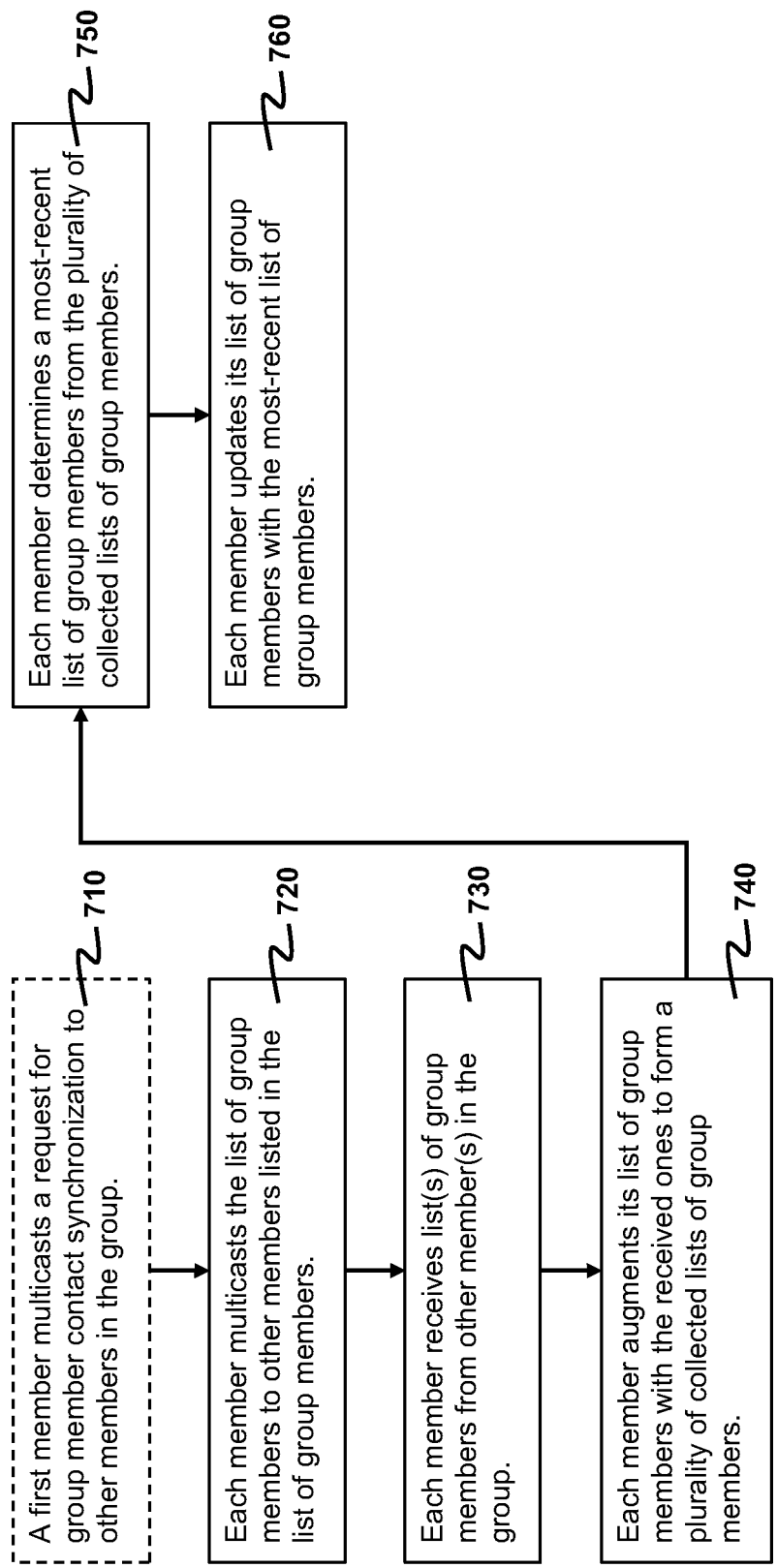
FIG. 7 depicts a flowchart showing exemplary steps of group member contact synchronization without a need for Internet connectivity in establishing the communication group.

Although it is convenient for the non-host members to update their corresponding lists of group members through contacting the cloud server 552, this updating approach is disrupted if some members attached to the same common LAN lose connectivity to the Internet 500. It happens when, for instance, the common LAN is an ad hoc network and a computing device attached to the ad hoc network and responsible for providing Internet connectivity is offline. Advantageously, the disclosed method enables group member contact synchronization among different members that are connected even in an absence of Internet connectivity. FIG. 7 depicts a flowchart showing exemplary steps of group member contact synchronization without a need for Internet connectivity. In the illustrative example to be used for illustrating the group member contact synchronization, assume that the first LAN 510 is disconnected from the Internet 500.

Consider that all the members 511-513 attached to the first LAN 510 are aware of a request for synchronizing respective lists of group members among the members 511-513, 522. Of course, the new member 522 is not aware of the request due to disconnection of the first LAN 510 from the Internet 500. In addition, some of the members attached to the first LAN 510 may not be aware that the former member 521 has left the group.

The members 511-513 are aware of the request due to either being an initiator of the request or being informed by the initiator. Usually, a first member among the members 511-513 in the first LAN 510 is the initiator of the request and multicasts the request to all the members in the group (not only in the first LAN 510) except the first member (step 710). In the illustrative example, assume that the member 512 is the initiator, and is not aware of the leave of the former member 521 and the addition of the new member 522. The member 512 multicasts the request to the members 511, 513, 521. Only the members 511, 513 receives the request.

In response to initiating or receiving the request, each member aware of the request in the group performs steps 720, 730, 740, 750, 760. Hence, these steps are individually performed by the members 511-513. For illustration hereinafter, consider that these steps are performed by the member 512. Executing these steps by any of the other members 512, 513 is similar.

In the step 720, the member 512 multicasts the local list of group members stored at the member 512 to all members listed in the list of group members except the member 512 itself, namely, to the members 511, 513, 521. Only the members 511, 513 receive copies of the member 512's local list of group members.

In the step 730, the member 512 receives one or more local lists of group members from any member in the group other than the member 512. In the illustrative example, assume that the member 512 successfully receives two local lists of group members from the members 511, 513.

In the step 740, the member 512 augments the member 512's local list of group members with the two received local lists of group members to form a plurality of collected local lists of group members.

In the step 750, the member 512 determines a most-recent local list of group members having a latest timestamp of last update in the plurality of collected local lists of group members. As the member 511 is also the host 511, the member 512 determines that the member 511's local list of group members is the most-recent one.

In the step 760, the member 512 updates its local list of group members with the most-recent one. Hence, the member 512 is allowed to update its local list of group members without a need to access the Internet 500.

Since the steps 720, 730, 740, 750, 760 are individually executed by the members 511-513, their corresponding local lists of group members are updated with the most-recent local list of group members. Group member contact synchronization is achieved.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for communicating data among computing devices distributed over plural local area networks (LANs) interconnected by the Internet, the method comprising:
assigning an instant-share (InS) address to an individual computing device, wherein the InS address is recognizable by a dedicated router located in the Internet and enables the dedicated router to communicate with the individual computing device;
when the individual computing device has a first data message to be sent to a first computing device, and if the individual computing device and the first computing device are attached to different LANs, performing:
embedding, by the individual computing device, a first InS address into the first data message to form an extended first data message, wherein the first computing device is assigned with the first InS address;
forwarding, by the individual computing device, the extended first data message to the dedicated router; and
forwarding, by the dedicated router, the extended first data message to the first computing device according to the first InS address extracted from the extended first data message, thereby allowing the first data message to be sent across different LANs without a need for the first computing device to acquire a static IP address in accomplishing cross-LAN unicast communication;
and
for a communication group consisting of members selected from the computing devices, when an individual member has a third data message to be multicast to remaining members in the group, performing:
dividing the remaining members into first and second sets of members such that the individual member and each member in the first set are attached to different LANs and such that the individual member and each member in the second set are attached to a same LAN denoted as a second common LAN;
creating or obtaining, by the individual member, a multicast InS address for representing a first list of respective InS addresses of members in the first set;
informing, by the individual member, the dedicated router that the multicast InS address is associated with the first list of respective InS addresses;
embedding, by the individual member, the multicast InS address into the third data message to form an extended third data message;
forwarding, by the individual member, the extended third data message to the dedicated router; and
multicasting, by the dedicated router, the extended third data message to all members in the first set according to the first list of respective InS addresses, thereby allowing the third data message to be multicast across different LANs without a need for all members in the first set to acquire respective static IP addresses in accomplishing cross-LAN multicasting communication.

2. The method of claim 1, wherein the extended first data message is transmitted from the individual computing device to the first computing device based on a transport-layer protocol (TLP) such that the extended first data message is encoded to be a plurality of TLP datagrams, a payload of an individual TLP datagram including the first InS address, the TLP being selected from Transmission Control Protocol and User Datagram Protocol.

3. The method of claim 1 further comprising:
when the individual computing device has a second data message to be sent to a second computing device and if the individual computing device and the second computing device are attached to a same LAN denoted as a first common LAN, forwarding, by the individual computing device, the second data message to the second computing device according to a dynamic IP address assigned by the first common LAN to the second computing device for accomplishing intra-LAN unicast communication.

4. The method of claim 1 further comprising:
when the individual computing device has a second data message to be sent to a second computing device and if the individual computing device and the second computing device are attached to a same LAN denoted as a first common LAN, forwarding, by the individual computing device, the second data message to the second computing device according to a non-IP protocol supported by the first common LAN for accomplishing intra-LAN unicast communication.

5. The method of claim 1, wherein the extended third data message is transmitted from the individual member to all the members in the first set based on a transport-layer protocol (TLP) such that the extended third data message is encoded to be a plurality of TLP datagrams, a payload of an individual TLP datagram including the multicast InS address, the TLP being selected from Transmission Control Protocol and User Datagram Protocol.

6. The method of claim 1 further comprising:
in multicasting the third data message to the remaining members in the group, forwarding, by the individual member, the third data message to respective members in the second set according to IP multicast as standardized by Internet Engineering Task Force (IETF) for accomplishing intra-LAN multicast communication, allowing all members in the second set to receive the third data message directly through the second common LAN without routing through and additionally burdening the dedicated router.

7. The method of claim 1 further comprising:
in multicasting the third data message to the remaining members in the group, forwarding, by the individual member, the third data message to respective members in the second set through a non-IP protocol supported by the second common LAN for accomplishing intra-LAN multicast communication, allowing all members in the second set to receive the third data message directly through the second common LAN without routing through and additionally burdening the dedicated router.

8. The method of claim 1 further comprising:
establishing a communication group consisting of members selected from the computing devices, wherein in establishing the group, the group is updated from time to time in response to admission of new members and leave of existing members, and wherein the establishing of the group comprises:
identifying a host among the members for managing admission of the new members into the group and removal of the existing members from the group;
creating and keeping, by an individual member in the group, a local list of group members at the individual member, wherein the local list of group members records all the members in the group, and includes a timestamp of last update for indicating recency of the local list of group members;
updating, by the host, a corresponding local list of group members of the host in response to occurrence of new-member admission or existing-member removal, wherein the host's corresponding local list of group members is an authentic list of group members for the communication group; and
regularly updating, by a non-host member in the group, a corresponding local list of group members of the non-host member with the authentic list of group members.

9. The method of claim 8, wherein the timestamp of last update is a version number of the list of group members.

10. The method of claim 8, wherein the host is identified to be a particular computing device that initiates creation of the group.

11. The method of claim 8, wherein the establishing of the group further comprises:

when the host admits a certain new member to join the group, acquiring, by the host, a copy of InS address of said certain new member, wherein the copy of InS address of said certain new member is further incorporated into the authentic list of group members in updating the authentic list of group members such that the authentic list of group members includes respective InS addresses of all the members in the group; and
sending, by the host, a copy of InS address of the host to said certain new member.

12. The method of claim 8, wherein the establishing of the group further comprises:
when the authentic list of group members is updated, storing, by the host, the authentic list of group members at a cloud server in the Internet for allowing the non-host member to update the non-host member's corresponding list of group members via obtaining the authentic list of group members from the cloud server.

13. The method of claim 8, wherein the establishing of the group further comprises:
in response to initiating or receiving, by the individual member, a request for synchronizing respective local lists of group members among the members, performing, by the individual member:
multicasting the local list of group members to all members listed in the local list of group members except the individual member;
receiving one or more local lists of group members from any member in the group other than the individual member;
augmenting the local list of group members with the received one or more local lists of group members to form a plurality of collected local lists of group members;
determining a most-recent local list of group members having a latest timestamp of last update in the plurality of collected local lists of group members; and
updating the local list of group members of the individual member with the most-recent local list of group members, whereby the individual member is allowed to update the local list of group members without a need to access the Internet.

14. The method of claim 13, wherein the establishing of the group further comprises:
multicasting, by a first member selected from the members, the request for synchronizing the respective lists of group members to all the members in the group except the first member, wherein the first member is an initiator of requesting synchronization of the respective lists of group members.

15. The method of claim 1, wherein the InS address of the individual computing device includes:
a static IP address of a gateway of a first LAN such that the dedicated router is communicable with the gateway, wherein the individual computing device is attached to the first LAN, and the gateway connects the first LAN and the Internet; and
a plurality of access-specific data for enabling the gateway to communicate with the individual computing device.

16. A method for communicating data among computing devices distributed over plural local area networks (LANs) interconnected by the Internet, the method comprising:
assigning an instant-share (InS) address to an individual computing device, wherein the InS address is recognizable by a dedicated router located in the Internet and enables the dedicated router to communicate with the individual computing device;

when the individual computing device has a first data message to be sent to a first computing device, and if the individual computing device and the first computing device are attached to different LANs, performing:
  embedding, by the individual computing device, a first InS address into the first data message to form an extended first data message, wherein the first computing device is assigned with the first InS address;
  forwarding, by the individual computing device, the extended first data message to the dedicated router; and
  forwarding, by the dedicated router, the extended first data message to the first computing device according to the first InS address extracted from the extended first data message, thereby allowing the first data message to be sent across different LANs without a need for the first computing device to acquire a static IP address in accomplishing cross-LAN unicast communication;
and
establishing a communication group consisting of members selected from the computing devices, wherein in establishing the group, the group is updated from time to time in response to admission of new members and leave of existing members, and wherein the establishing of the group comprises:
  identifying a host among the members for managing admission of the new members into the group and removal of the existing members from the group;
  creating and keeping, by an individual member in the group, a local list of group members at the individual member, wherein the local list of group members records all the members in the group, and includes a timestamp of last update for indicating recency of the local list of group members;
  updating, by the host, a corresponding local list of group members of the host in response to occurrence of new-member admission or existing-member removal, wherein the host's corresponding local list of group members is an authentic list of group members for the communication group; and
  regularly updating, by a non-host member in the group, a corresponding local list of group members of the non-host member with the authentic list of group members.

17. The method of claim 16, wherein the timestamp of last update is a version number of the list of group members.

18. The method of claim 16, wherein the host is identified to be a particular computing device that initiates creation of the group.

19. The method of claim 16, wherein the establishing of the group further comprises:

when the host admits a certain new member to join the group, acquiring, by the host, a copy of InS address of said certain new member, wherein the copy of InS address of said certain new member is further incorporated into the authentic list of group members in updating the authentic list of group members such that the authentic list of group members includes respective InS addresses of all the members in the group; and sending, by the host, a copy of InS address of the host to said certain new member.

20. The method of claim 16, wherein the establishing of the group further comprises:
  when the authentic list of group members is updated, storing, by the host, the authentic list of group members at a cloud server in the Internet for allowing the non-host member to update the non-host member's corresponding list of group members via obtaining the authentic list of group members from the cloud server.

21. The method of claim 16, wherein the establishing of the group further comprises:
  in response to initiating or receiving, by the individual member, a request for synchronizing respective local lists of group members among the members, performing, by the individual member:
    multicasting the local list of group members to all members listed in the local list of group members except the individual member;
    receiving one or more local lists of group members from any member in the group other than the individual member;
    augmenting the local list of group members with the received one or more local lists of group members to form a plurality of collected local lists of group members;
    determining a most-recent local list of group members having a latest timestamp of last update in the plurality of collected local lists of group members; and
    updating the local list of group members of the individual member with the most-recent local list of group members, whereby the individual member is allowed to update the local list of group members without a need to access the Internet.

22. The method of claim 21, wherein the establishing of the group further comprises:
  multicasting, by a first member selected from the members, the request for synchronizing the respective lists of group members to all the members in the group except the first member, wherein the first member is an initiator of requesting synchronization of the respective lists of group members.

* * * * *